United States Patent
Moore et al.

(10) Patent No.: US 6,725,294 B1
(45) Date of Patent: Apr. 20, 2004

(54) INSTALLATION AND ACCESS OF A DEVICE HANDLER FOR A PERIPHERAL DEVICE IN A COMPUTER

(75) Inventors: Derick G. Moore, Colorado Springs, CO (US); Roy W. Wade, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 395 days.

(21) Appl. No.: 09/790,088

(22) Filed: Feb. 20, 2001

(51) Int. Cl.[7] .................. G06F 13/00; G06F 13/14; G06F 9/46; G06F 9/445; G06F 15/177
(52) U.S. Cl. .................. 710/36; 710/8; 710/10; 710/13; 710/31; 710/37; 710/38; 710/104; 713/1; 713/2; 713/100; 709/100; 709/321; 709/327
(58) Field of Search .................. 710/8, 10, 13, 710/31, 36, 37, 38, 104; 713/1, 2, 100; 709/100, 321, 325, 326, 327

(56) References Cited

U.S. PATENT DOCUMENTS

| | | | | |
|---|---|---|---|---|
| 5,448,741 A | * | 9/1995 | Oka ........................ 713/2 |
| 5,590,376 A | * | 12/1996 | Kou ........................ 710/19 |
| 5,604,887 A | * | 2/1997 | Naidu et al. ............... 703/27 |
| 5,694,600 A | * | 12/1997 | Khenson et al. ............ 713/2 |
| 5,701,483 A | * | 12/1997 | Pun ........................ 709/321 |
| 5,727,213 A | * | 3/1998 | Vander Kamp et al. ...... 713/2 |
| 5,745,762 A | * | 4/1998 | Celi et al. ................. 709/323 |
| 5,887,164 A | * | 3/1999 | Gupta ...................... 713/2 |
| 5,909,592 A | * | 6/1999 | Shipman ................... 710/10 |
| 6,061,745 A | * | 5/2000 | Mahmoud .................. 710/1 |
| 6,233,624 B1 | * | 5/2001 | Hyder et al. ............... 709/327 |
| 6,240,468 B1 | * | 5/2001 | Capelli .................... 710/14 |
| 6,282,641 B1 | * | 8/2001 | Christensen ............... 713/2 |
| 6,304,965 B1 | * | 10/2001 | Rickey ..................... 713/2 |
| 6,308,264 B1 | * | 10/2001 | Rickey ..................... 713/2 |
| 6,317,828 B1 | * | 11/2001 | Nunn ....................... 713/2 |
| 6,401,140 B1 | * | 6/2002 | Wu ......................... 710/10 |
| 6,633,929 B1 | * | 10/2003 | Hyder et al. ............... 710/62 |
| 2002/0138680 A1 | * | 9/2002 | Stevens .................... 710/260 |

OTHER PUBLICATIONS

IBM Technical Disclosure Bulletin, Feb. 1988, US, vol. 30, Issue 9, pp. 49–52.*

IBM Technical Disclosure Bulletin, Dec. 1993, US, vol. 36, Issue 12, pp. 503–504.*

* cited by examiner

*Primary Examiner*—Jeffrey Gaffin
*Assistant Examiner*—Tanh Nguyen
(74) *Attorney, Agent, or Firm*—John R. Ley, LLC

(57) ABSTRACT

In a computer (e.g. an 80×86-compatible personal computer) in which peripheral devices (e.g. hard drives, floppy drives, CD-ROMs, etc.) are accessed through more than one chain of handlers for the peripheral devices (e.g. via interrupts 13h and 40h), an improved device handler for a peripheral device (e.g. a device that complies with the "El Torito" standard) is inserted in both chains (e.g. by "hooking" both interrupts 13h and 40h), so the device handler cannot be bypassed when an access request directed to the device handler is passed through either chain and so the device handler can direct the access request to the next device handler in the correct chain, when appropriate.

3 Claims, 7 Drawing Sheets

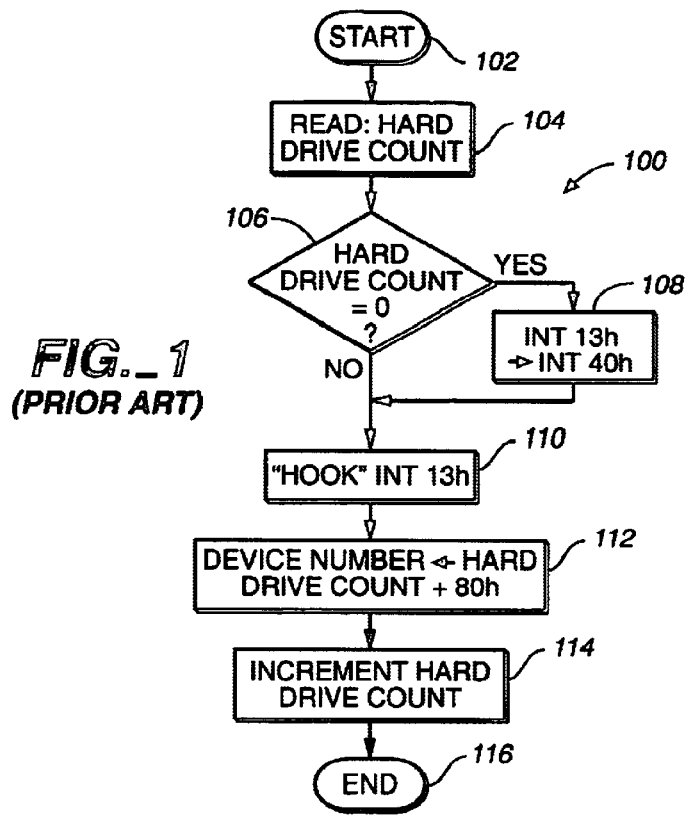
FIG._1
*(PRIOR ART)*
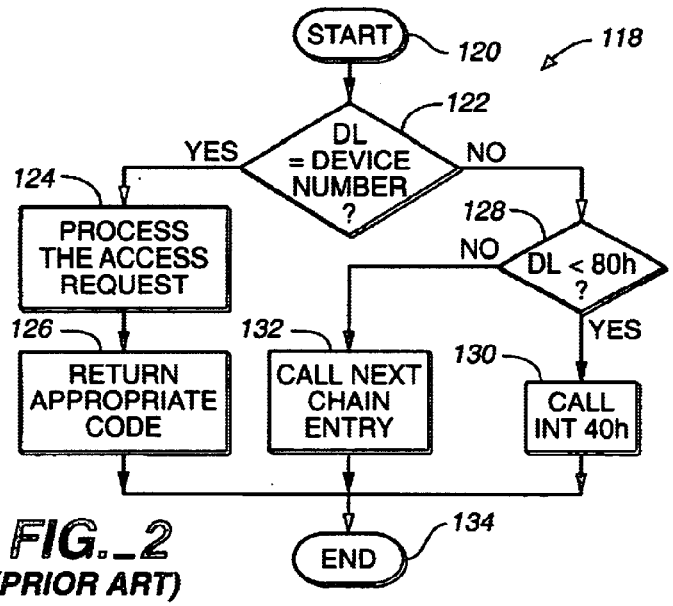
FIG._2
*(PRIOR ART)*

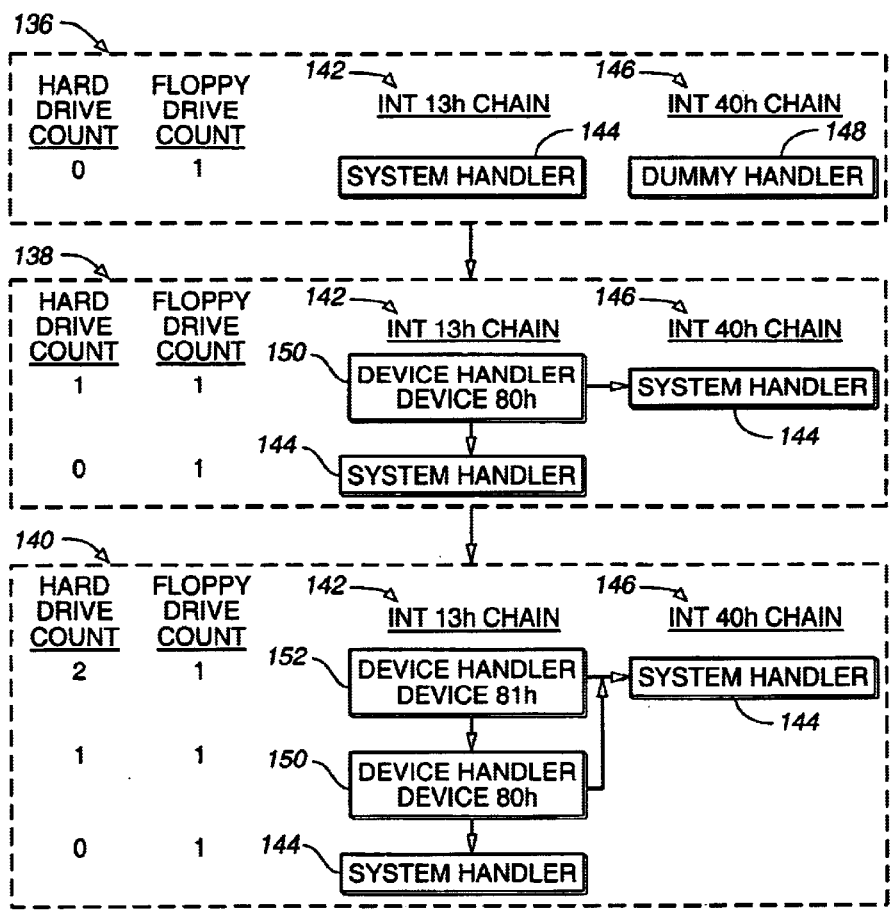
FIG._3
*(PRIOR ART)*

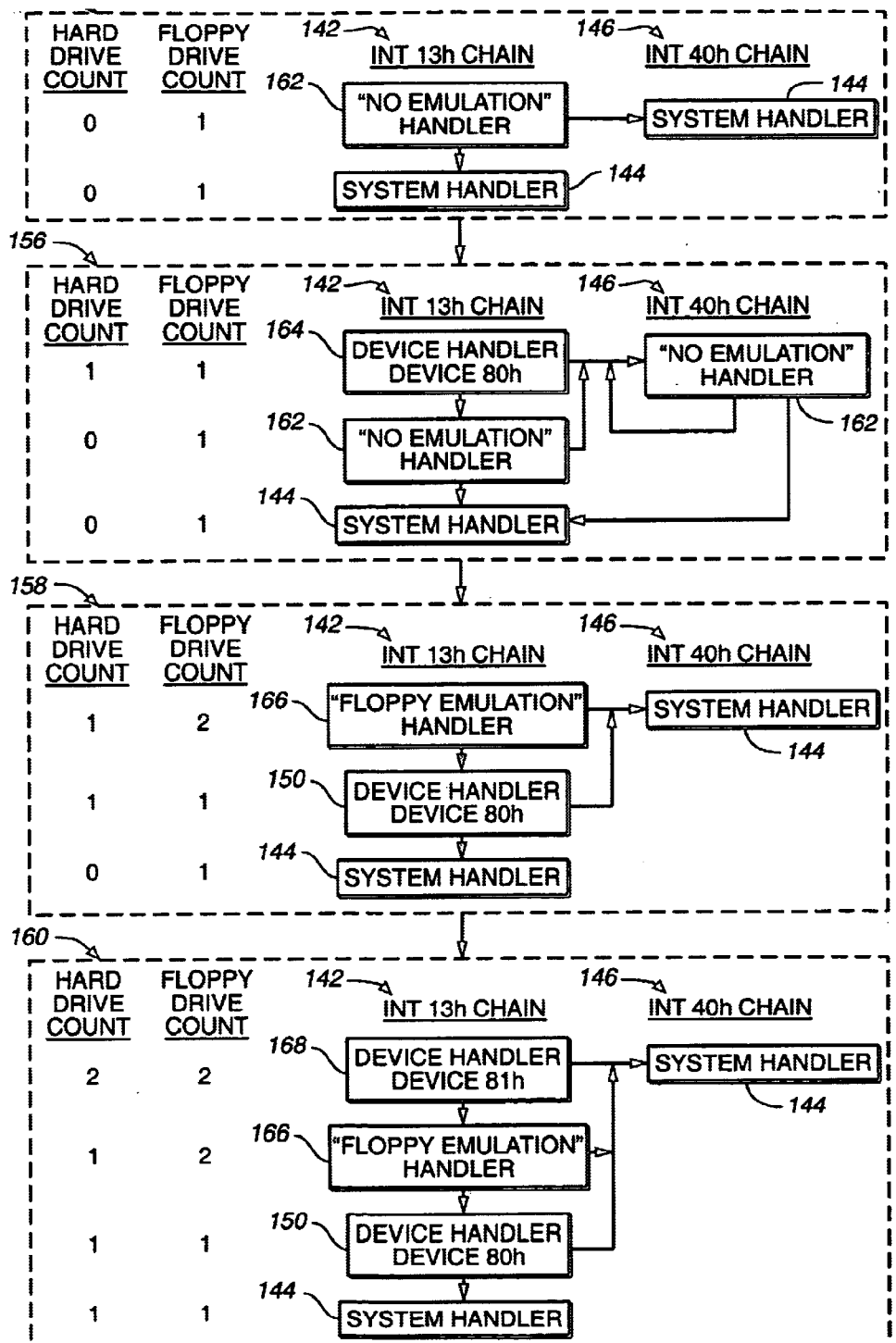
FIG._4 (PRIOR ART)

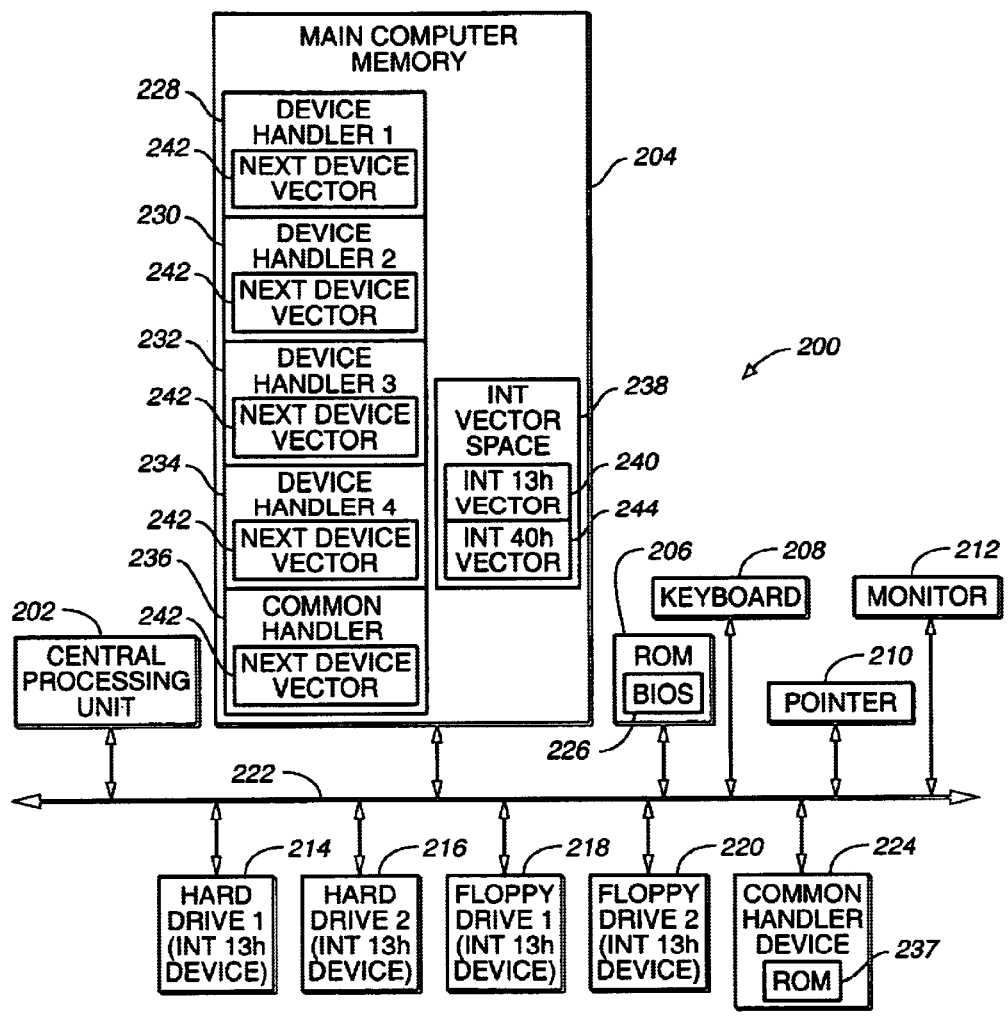
FIG._5

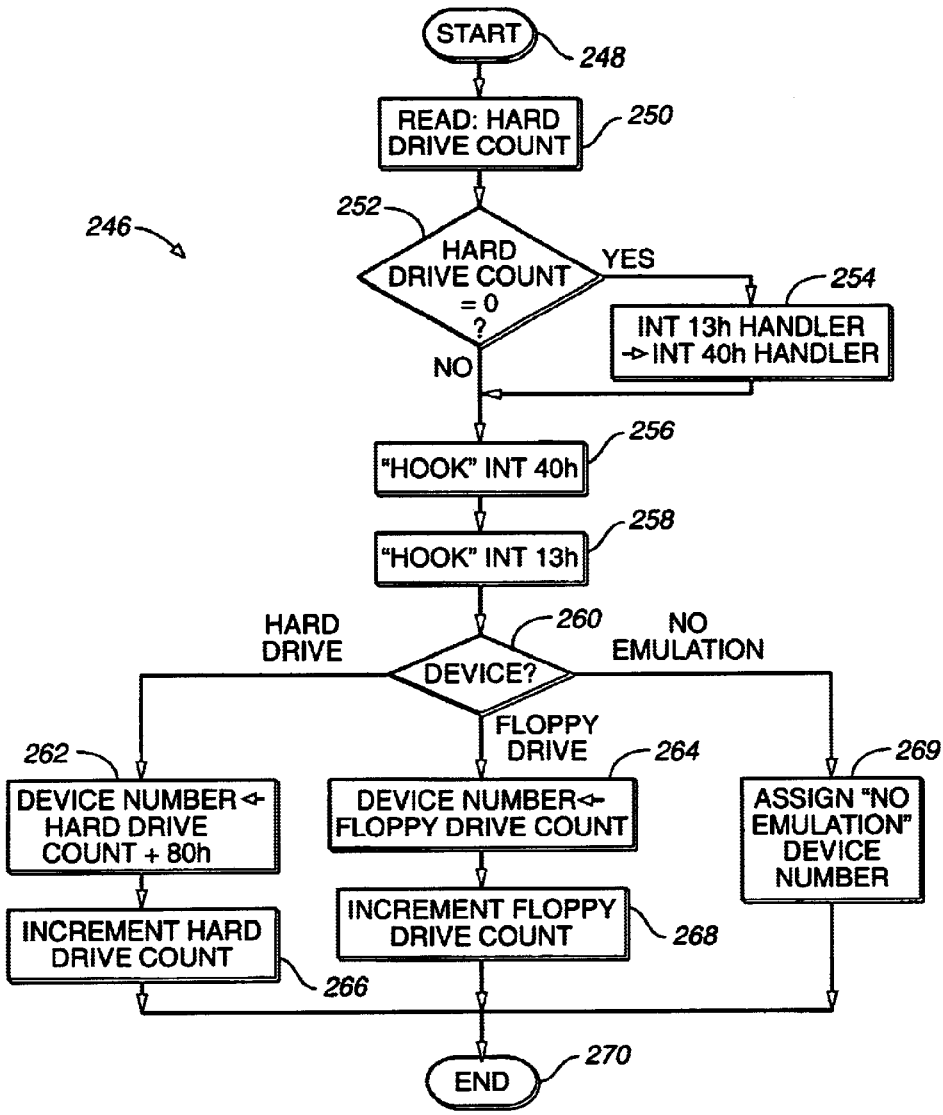
FIG._6

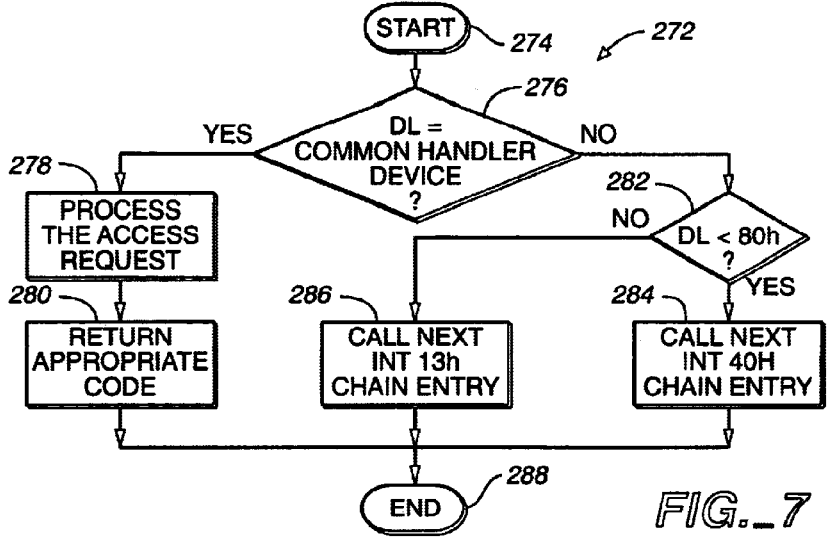
FIG._7
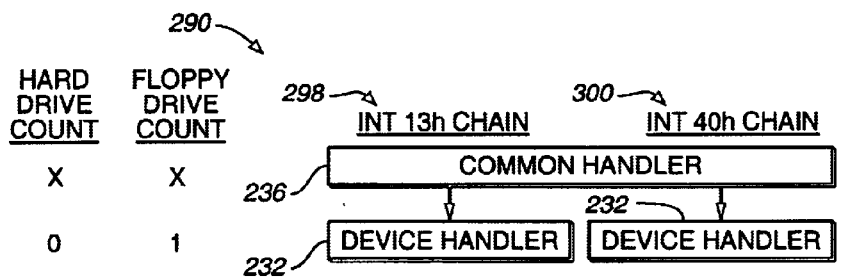
FIG._8
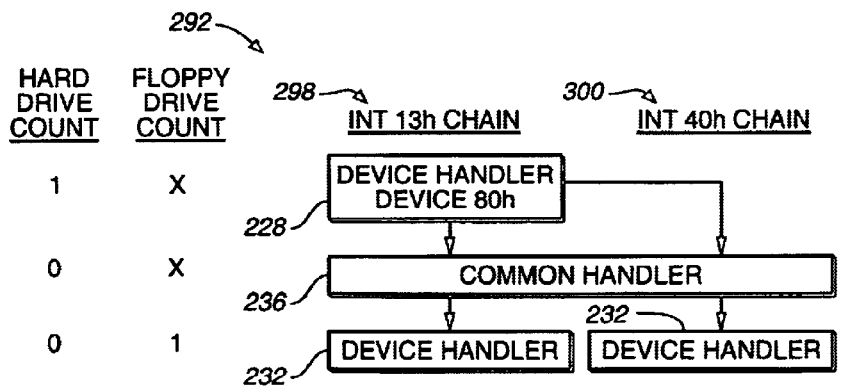
FIG._9

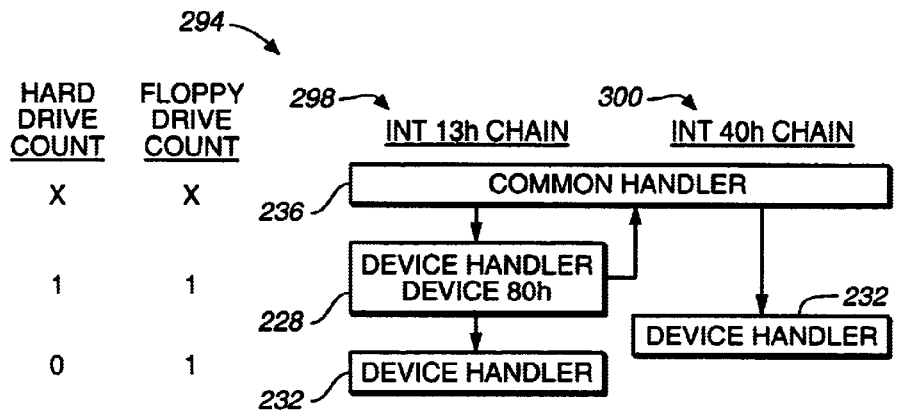
FIG._10
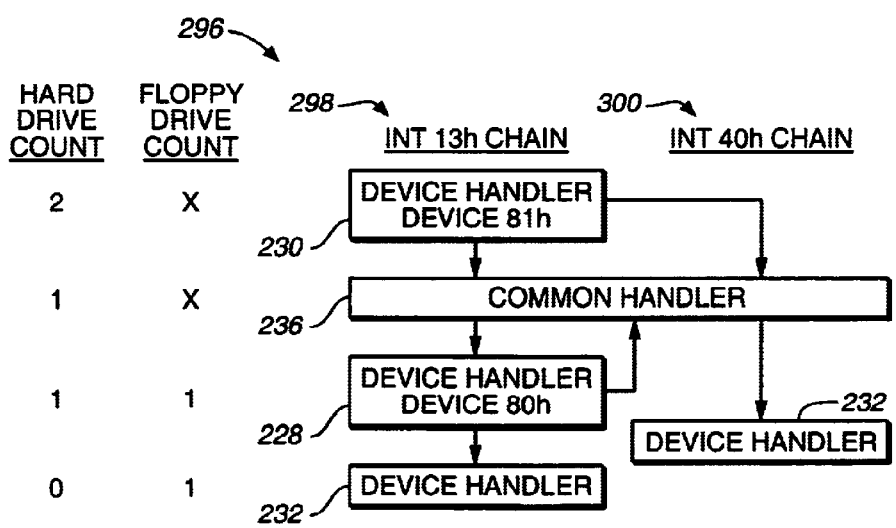
FIG._11

INSTALLATION AND ACCESS OF A DEVICE HANDLER FOR A PERIPHERAL DEVICE IN A COMPUTER

FIELD OF THE INVENTION

This invention relates to the "boot" process of computers, such as personal computers. More particularly, the present invention relates to an improved technique for initializing certain devices, such as floppy drives, hard drives, compact disk drives, etc., during the start-up of a computer.

BACKGROUND OF THE INVENTION

The original 80×86-based personal computers (PC's) booted from a combination of the PC's BIOS (Basic Input/Output System) firmware stored in read-only memory (ROM) and an operating system (OS) stored on a floppy disk installed in the floppy drive. Once fixed disks, or hard drives, became available, PC's were developed with the ability to boot from the hard drives. Today, PC's still commonly boot from a hard drive, but the PC industry has also developed a standard by which PC's can boot from a compact disk (CD-ROM). This standard is known as the "El Torito Bootable CD-ROM Format Specification."

To boot from the floppy drive, the BIOS firmware begins the initial boot process, but then "calls" the standard interrupt 13h (INT 13h) to access the floppy drive "handler" (software that interfaces with the floppy drive) to complete the boot process and load the OS from the floppy disk. (The "h" appended to a number indicates hexadecimal numbering.) To install the hard drive upon start-up so that the PC boots from it instead of from the floppy drive, the BIOS firmware moves the floppy drive handler from INT 13h to the standard INT 40h and places the handler for the hard drive in the INT 13h location. The process of replacing the INT 13h handler and retaining the previous INT 13h handler is commonly called "hooking" INT 13h. If an additional hard drive, option ROM, "Plug-and-Play" device or other INT 13h device is installed during the start-up, then firmware for the additional device "hooks" INT 13h again, retaining the previous INT 13h handler in order to pass on access requests for other devices. It is possible for several INT 13h devices to be installed with each device placing its own handler at INT 13h and retaining the previous INT 13h handler, thereby creating a "chain" of INT 13h devices.

An exemplary prior art procedure 100 for installing an INT 13h device (e.g. a hard drive) at the start-up of a PC is shown in FIG. 1. Once the procedure 100 starts (step 102), the software reads (step 104) the current hard drive count and determines (step 106) whether the hard drive count is zero, indicating whether another INT 13h hard drive has already been installed. If no other INT 13h hard drive has been installed, then the current device handler for the INT 13h (assumed to be the floppy drive handler) is redirected (step 108) to the INT 40h. After redirecting (step 108) the floppy drive handler or if the hard drive count is not zero (step 106), the procedure 100 "hooks" (step 110) the current INT 13h, thereby installing the new INT 13h device. The new INT 13h device is then designated (step 112) with a device number equal to the current hard drive count plus 80h, since add-in drives. (e.g. hard drives, CD-ROMs, magneto optical drives, removable hard drives, etc.) are designated as devices 80h through FFh. (Floppy drives are designated as devices 00h through 7Fh.) The hard drive count is then incremented (step 114) by one, and the procedure 100 ends (step 116).

An exemplary prior art procedure 118 for an INT 13h device handler to respond to an access request is shown in FIG. 2. Once the procedure 118 starts (step 120), it is determined (step 122) whether the device number specified by the calling program in the standard DL register is the same as the device number for the current INT 13h device, indicating that this device is the requested device. If this device is the requested device, then the access request is processed (step 124) and the appropriate code (e.g. indicating success or failure) is returned (step 126) to the calling program. If this device is not the requested device (step 122), then if the device number specified in the DL register is less than 80h (step 128), indicating that the floppy drive is the requested device, then the procedure 118 calls (step 130) INT 40h to handle the access request to the floppy drive. If the device number specified in the DL register is not less than 80h (step 128), indicating that the requested device is another INT 13h device (e.g. another hard drive), then the procedure 118 calls (step 132) the next entry (which was "hooked" at step 110 in the procedure 100 in FIG. 1) in the chain of INT 13h devices. The procedure 118 ends at step 134.

States 136, 138 and 140 of a typical prior art PC are shown in FIG. 3 prior to the installation of any INT 13h devices (state 136), after the installation of one INT 13h device (state 138) and after the installation of a second INT 13h device (state 140). At state 136, there are no added INT 13h devices, such as hard drives, indicated by the hard drive count. There is one floppy drive (not shown) indicated by the floppy drive count. The chain 142 of INT 13h devices includes only the standard system handler 144 for the floppy drive. The chain 146 of INT 40h devices is empty or may include a "dummy" handler 148 or the system handler 144. Only the system handler 144 is able to respond to an access request according to the procedure 118 (FIG. 2).

At state 138, one INT 13h device, such as a hard drive (not shown), has been installed by the procedure 100 (FIG. 1) in a PC previously having the state 136. There are the one hard drive indicated by the hard drive count and one floppy drive (not shown) indicated by the floppy drive count. The chain 142 of INT 13h devices now includes the device handler 150 for the INT 13h device having device number 80h followed by the original system handler 144, since the previous INT 13h handler was "hooked" at step 110 (FIG. 1) in the procedure 1006. Additionally, the chain 146 of INT 40h devices now includes the original system handler 144, since the system handler 144 was redirected to INT 40h at step 108 (FIG. 1) in the procedure 100. Therefore, if an access request is not directed to the device numbered 80h, as determined from the DL register at step 122 (FIG. 2) of the procedure 118 (FIG. 2), the device handler 150 will redirect the access request to the system handler 144 at step 130 or 132 (FIG. 2) of the procedure 118.

At state 140, the second INT 13h device (not shown) has been installed by the procedure 100 (FIG. 1) in a PC previously having the state 138. There are two hard drives and one floppy drive indicated by the hard drive count and the floppy drive count, respectively. The chain 142 of INT 13h devices, as generated by the procedure 100, now includes the device handler 152 for the INT 13h device numbered 81h followed by the device handler 150 the INT 13h device numbered 80h followed by the system handler 144. Additionally, the chain 146 of INT 40h devices still includes the system handler 144. Therefore, when the device handler 152 receives an access request under the procedure 118 (FIG. 2), if the access request is not directed to the device numbered 81h, as determined at step 122 (FIG. 2), the device handler 152 will pass the access request either to the system handler 144 (step 130, FIG. 2) or to the device handler 150 (step 132, FIG. 2). If the device handler 152 passes the access request to the device handler 150 (step 132), then if the device handler 150 determines at step 122 (FIG. 2) that the access request is not directed to the device numbered 80h, the device handler 150 passes the access request to the system handler 144 at step 130 or 132 (FIG. 2).

States 154, 156, 158 and 160 of a typical prior art PC are shown in FIG. 4 after the installation of an "El Torito" device in combination with the installation of one or more INT 13h devices. An "El Torito" device emulates either a bootable floppy drive or a bootable hard drive or references an executable application, referred to as "floppy emulation," "hard drive emulation" and "no emulation," respectively.

The state 154 shows the typical prior art PC after the installation of a "no emulation El Torito" device into a PC previously having the state 136 shown in FIG. 3. Since the hard drive count was zero, the process 100 (FIG. 1) copied the previous INT 13h handler (the system handler 144) to INT 40h at step 108 (FIG. 1). Then the process 100 inserted (step 110) a "no emulation" handler 162 with any appropriate non-conflicting device number in the range 81h to FFh for the "El Torito" device into the INT 13h chain 142 in front of the system handler 144. According to the "El Torito" standard, however, the installation of the "no emulation" handler 162 does not increment the hard drive count at step 114 (FIG. 1) of the procedure 100 since no hard drive has actually been added to the PC.

The state 156 shows the typical prior art PC after the installation of an INT 13h device into a PC previously having the state 154. Since the hard drive count is still zero at step 106 (FIG. 1), the procedure 100 (FIG. 1) copies the current INT 13h handler (the "no emulation" handler 162) to INT 40h, effectively erasing the system handler 144 from the INT 40h chain 146. The procedure 100 then inserts a device handler 164 for the INT 13h device numbered 80h into the INT 13h chain 142 in front of the "no emulation" handler 162. When an access request is issued for the original floppy drive (device number 00h), the device handler 164 reissues the access request at step 130 (FIG. 2) of the procedure 118 (FIG. 2) as an INT 40h request. As an INT 40h request, however, the access request encounters the "no emulation" handler 162 in the INT 40h chain 146. The "no emulation" handler 162 continues to reissue the access request at step 130 of the procedure 118 as an INT 40h request, resulting in an infinite loop that never reaches the system handler 144 for the floppy drive.

The state 158 shows the typical prior art PC after the installation of a "floppy emulation El Torito" device into a PC previously having the state 138 shown in FIG. 3. A "floppy emulation" handler 166 for the "floppy emulation El Torito" device is inserted into the INT 13h chain 142 in front of the device handler 150. The "El Torito" standard requires that "floppy emulation" devices have device number 00h. Therefore, when the "floppy emulation" handler 166 encounters an access request for a device number that is not 00h at step 122 (FIG. 2) of the procedure 118 (FIG. 2), the access request is passed either to the system handler 144 (step 130, FIG. 2) or to the device handler 150 (step 132, FIG. 2). Upon installation of the "floppy emulation" device, the PC is reconfigured to give the original floppy drive a device number of 01h, but the system handler 144 for the original floppy drive is still configured to respond as device number 00h. Therefore, when the device number is 01h, the "floppy emulation" handler 166 decrements the device number to 00h before passing the access request to the system handler 144 and increments the device number back to 01h before returning the response to the calling program.

The state 160 shows the typical prior art PC after the installation of a second INT 13h device into a PC previously having the state 158. A device handler 168 for the INT 13h device, having device number 81h, is inserted into the INT 13h chain 142 in front of the "floppy emulation" handler 166 by the procedure 100 (FIG. 1). When the device handler 168 receives an access request that is not directed to the device numbered 81h, the access request is passed either to the system handler 144 (step 130, FIG. 2) or to the "floppy emulation" handler 166 (step 132, FIG. 2). However, when the access request is directed to the "floppy emulation El Torito" device, with device number 00h, as required by the "El Torito" standard, the device handler 168 passes the access request to the system handler 144 at step 130, instead of to the "floppy emulation" handler 166, since the determination at step 128 (FIG. 2) is positive. Therefore, the "floppy emulation" handler 166 is always bypassed when the access request is specifically directed to the "floppy emulation El Torito" device.

It is with respect to these and other background considerations that the present invention has evolved.

SUMMARY OF THE INVENTION

The present invention eliminates the above described problems involving "El Torito" devices installed in a PC. In particular, infinite loops are avoided and no device handler is bypassed, so every device handler can be properly accessed.

An improvement of the present invention involves a device handler that preferably "hooks" both INT 13h and INT 40h by inserting the device handler into both the INT 13h chain and the INT 40h chain. In other words, when the device handler is installed, a vector pointing to it is inserted into the vector storage space for both INT 13h and 40h. Any previously inserted vectors in both vector storage spaces are retained by the device handler. When a subsequent device handler, whether a conventional device handler or another of the improved device handler, is installed, the vector for the previously installed improved device handler is copied from the affected vector storage space(s) for INT 13h and/or INT 40h.

In this manner, access requests are not misdirected. Instead, access requests that pass through either the INT 13h chain or the INT 40h chain are received by the improved handler, which determines the correct device that is to respond to the access request or the correct interrupt chain to which to pass the access request.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a flow chart of a prior art procedure for configuring a computer to use a peripheral device.

FIG. 2 is a flow chart of a prior art procedure for accessing a peripheral device in a computer configured according to the procedure shown in FIG. 1.

FIG. 3 is a block diagram of different prior art configuration states of a computer configured according to the procedure shown in FIG. 1.

FIG. 4 is a block diagram of different prior art configuration states of a computer configured according to the procedure shown in FIG. 1 to include an "El Torito" device.

FIG. 5 is a block diagram of an exemplary architecture of a computer incorporating the present invention.

FIG. 6 is a flow chart of a procedure according to the present invention for configuring a computer, as shown in FIG. 5, to use a peripheral device, including an "El Torito" device.

FIG. 7 is a flow chart of a procedure for accessing a peripheral device in a computer configured according to the procedure shown in FIG. 6.

FIGS. 8, 9, 10 and 11 are block diagrams of different configuration states of a computer configured according to the procedure shown in FIG. 6.

DETAILED DESCRIPTION

A computer 200, as shown in FIG. 5, such as an 80x86-compatible personal computer, generally has an architecture that includes several conventional components, such as a central processing unit 202, a main computer memory 204, a read only memory (ROM) 206, a keyboard 208, a mouse or pointing device 210, a monitor 212, one or more hard drives 214 and 216 and one or more floppy drives 218 and 220 ("INT 13h devices"), among other conventional components (not shown) connected together by one or more conventional bus systems 222 (e.g. Industry Standard Architecture "ISA," Peripheral Component Interconnect "PCI," etc.). According to the present invention, the computer 200 also includes a "common handler device" 224, such as a peripheral device that conforms to the known "El Torito" standard, connected to the bus system 222. Among other features, the "El Torito" standard specifies a way for the computer 200 to "boot" from a compact disk (CD-ROM), such as the common handler device 224, instead of from one of the floppy drives 218 or 220 or the hard drives 214 or 216. According to the "El Torito" standard, the common handler device 224 may emulate either a bootable floppy drive or a bootable hard drive or may reference an executable application, referred to as "floppy emulation," "hard drive emulation" and "no emulation," respectively.

When starting, or "booting up," itself upon power-on or reset, the computer 200 uses an installation procedure as part of a BIOS (Basic Input/Output System) program 226 (contained in the ROM 206), or BIOS extensions (not shown), to "install" the peripheral devices, such as the hard drives 214 and 216, the floppy drives 218 and 220 and the common handler device 224. The "installation" of the peripheral devices 214–220 and 224 configures the computer 200 to use, or access, these devices. The computer 200 accesses these devices 214–220 and 224 by issuing an interrupt "call" to a conventional interrupt (INT) 13h or INT 40h during the remainder of the boot process or afterwards during normal operations.

Typically, the installation of the peripheral devices 214–220 and 224 causes a device handler, or device driver, 228, 230, 232, 234 and 236 for each of the peripheral devices 214–220 and 224 to be installed as "resident" in the main computer memory 204. The device handlers 228–236 are supplied by "BIOS extensions" conventionally stored in the ROM 206 or in a separate ROM (e.g. ROM 237 in the common handler device 224) located on a mother board (not shown) or on a printed circuit board (not shown) for the peripheral devices 214–220 and 224. The device handlers 228–236 include software used by the central processing unit 202 for accessing the peripheral devices 214–220 and 224. Upon installation of each device handler 228–236, under conventional 80x86 personal computer procedures, a corresponding vector, or execution pointer, (address of the corresponding device handler 228–236 in the main computer memory 204) is inserted into a conventional interrupt vector space 238 for a conventional INT 13h vector 240. Any previously inserted INT 13h vector 240 for a previously installed device handler 228–236 is retained by the newly installed device handler 228–236. Thus, an INT 13h "chain" of device handlers 228–236 is formed wherein each device handler 228–236 maintains a vector 242 that points to the next device handler 228–236 in the chain, and the INT 13h vector 240 points to the first device handler 228–236 in the chain. The insertion of a new INT 13h vector 240 for the new device handler 228–236 and the retention of the previous INT 13h vector 240 by the new device handler 228–236 is commonly referred to as "hooking the INT 13h."

Under the conventional 80x86 personal computer procedures, the first peripheral device to be installed by the BIOS 226 is one of the floppy drives (e.g. 218). The device handler (e.g. 232) for the floppy drive 218 is installed as resident in the main computer memory 204, and the INT 13h vector 240 is set to point to the device handler 232. Upon installation of the next peripheral device 214, 216, 220 or 224, the conventional 80x86 procedures dictate that the INT 13h vector 240 for the floppy drive 218 be copied to the interrupt vector space 238 for a conventional INT 40h vector 244, thereby forming an INT 40h chain of device handlers. The INT 13h vector 240 for the floppy drive 218 is also maintained by the newly installed device handler 228, 230, 234 or 236, as mentioned above, in the INT 13h chain.

Usually, the device handler 232 for the initial floppy drive 218 is the only device handler in the INT 40h chain. In other words, the INT 40h is rarely "hooked" in the prior art, but never by the same device that hooks the INT 13h. According to the present invention, however, the installation procedure for the common handler device 224 "hooks" both the INT 13h and the INT 40h. Therefore, the common handler device 224 can be accessed via either the INT 13h chain or the INT 40h chain.

When access to a desired peripheral device 214–220 or 224 is requested, e.g. by a program (not shown) executing on the central processing unit 202, the central processing unit 202 issues an INT 13h request. According to the INT 13h request, the INT 13h vector 240 directs the central processing unit 202 to the first device handler (e.g. 228) in the INT 13h chain. The first device handler 228 determines whether the access request is directed to itself, if not, however, the first device handler 228 then determines whether the access request is to be reissued as an INT 40h request or passed to the next device handler 230–236 in the INT 13h chain. Each device handler 228–236 makes these determinations, until the device handler 228–236 for the desired peripheral device 214–220 or 224 receives the access request and responds accordingly or an error is returned to the requesting program.

A procedure 246, performed by the BIOS 226 (FIG. 5) or a BIOS extension (not shown), for installing the common handler device 236 (FIG. 5) for the common handler device 224 (FIG. 5) is shown in FIG. 6. The procedure 246 starts at step 248 and reads the current hard drive count from a conventional globally accessible memory location (not shown) at step 250. If the hard drive count is zero, as determined at step 252, meaning that no hard drives 214 or 216 (FIG. 5) have yet been "installed" in the computer 200 (FIG. 5), then the vector 240 (FIG. 5) for the current INT 13h device handler 228–234 (FIG. 5) is copied to the INT 40h at step 254. If the hard drive count is not zero (step 252) or after the INT 13h has been redirected to the INT 40h (step 254), the procedure 246 "hooks" the INT 40h (step 256) and the INT 13h (step 258). In other words, the INT 13h vector 240 and the INT 40h vector 244 (FIG. 5) are both set to point to the common handler 236, and the previous INT 13h and 40h vectors 240 and 244 are retained by the common handler 236.

Depending on whether the common handler device 224 (FIG. 5) emulates a hard drive or a floppy drive (step 260), the device number for the common handler device 224 and the common handler 236 (FIG. 5) is set either to the hard drive count plus 80h (step 262) or to the floppy drive count (step 264). Afterwards, the hard drive count (step 266) or floppy drive count (step 268), respectively, is incremented. If the common handler device 224 is a "no emulation" device (determined at step 260), however, then the device number is set (step 269) to a value allowed by the "El Torito" specification, which is any value between 80h and FFh, inclusive. The procedure 246 ends at step 270.

A procedure 272 for responding to an access request by the common handler 236 (FIG. 5) is shown in FIG. 7. The procedure 272 starts at step 274. It is determined, at step 276, whether the device number of the requested device, as specified by the requesting program in the conventional DL register, is the same as that for the common handler device 224 (FIG. 5), set by the procedure 246 (FIG. 6) at step 262 or 264 (FIG. 6). If so, then the common handler 236 processes the access request (e.g. data read, data write, etc.) at step 278 and returns an appropriate code (e.g. success, failure, etc.) at step 280. If the determination at step 276 is negative, however, meaning that the common handler device 224 is not the requested device, then it is determined whether the device number of the requested device is less than 80h at step 282. If so, meaning that the requested device is a floppy drive, then the next entry in the INT 40h chain is called at step 284, rather than reissuing the access request as an INT 40h request, as done in the prior art at step 130 (FIG. 2) of the procedure 118 (FIG. 2). If the determination at step 282 is negative, meaning that the requested device is a hard drive or a "no emulation" device, then the next entry in the INT 13h chain is called at step 286. The procedure 272 ends at step 288.

FIGS. 8, 9, 10 and 11 show four states 290, 292, 294 and 296, respectively, of the computer 200 (FIG. 5) as the common handler device 224 (FIG. 5) and some of the other peripheral devices 214–220 (FIG. 5) are installed during the "boot" process. The common handler 236 (see also FIG. 5) for the common handler device 224 is installed in INT 13h and 40h chains 298 and 300 before and/or after other device handlers (e.g. 228, 230 and 232 also shown in FIG. 5) in each state 290–296. The states 290–296 also show the flow of control over an access request as it is passed through and between the INT 13h and 40h chains 298 and 300.

For state 290 (FIG. 8), the common handler 236 is installed in a computer (e.g. 200, FIG. 5) having a previous state similar to the state 136 shown in FIG. 3, wherein a floppy drive (e.g. 218 shown in FIG. 5) has been previously installed with a device handler (e.g. 232, also shown in FIG. 5), typically a conventional system handler. During the installation of the common handler 236, the INT 13h vector 240 (FIG. 5) for the device handler 232 is copied to the INT 40h vector 244 (FIG. 5) at step 254 (FIG. 6) of the installation procedure 246 (FIG. 6). The INT 13h and 40h vectors 240 and 244 are copied to the common handler 236 and the INT 13h and 40h vectors 240 and 244 are set to point to the common handler 236, at steps 256 and 258 (FIG. 6), thereby "hooking" both the INT 13h and 40h. In this manner, the common handler 236 is installed in both INT 13h and 40h chains 298 and 300. The hard drive count and floppy drive count after the common handler 236 has been installed are designated with an "X" in a conventional "don't care" notation, since a similar situation would result if the Common Handler were to add more than one drives or if any number of other device handlers (not shown) had been installed between the common handler 236 and the device handler 232. Under the procedure 272 (FIG. 7), if the access request is not directed to the common handler 236, as determined at step 276 (FIG. 7), then the common handler 236 passes the access request to the next device handler (e.g. 232) in the appropriate INT 13h or 40h chain 298 or 300 at step 286 or 284 (FIG. 7).

For state 292 (FIG. 9), a device handler (e.g. 228, also shown in FIG. 5) for an INT 13h device (e.g. hard drive 214, FIG. 5) is installed after the common handler 236 in a computer (e.g. 200, FIG. 5) having the previous state 290 (FIG. 8). Assuming that the common handler 236 involves the "El Torito" standard "floppy emulation" or "no emulation" and that no other hard drive handlers have been installed between the common handler 236 and the device handler 232, the hard drive count after installation of the common handler 236 is zero, and the device number for the device handler 228 is 80h. Since the device numbered 80h (hard drive 214) is not a common handler device, it is installed using the conventional installation procedure 100 (FIG. 1) and responds to access requests using the conventional procedure 118 (FIG. 2). Under the installation procedure 100, since the hard drive count is zero at step 106 (FIG. 1), the INT 13h vector 240 (FIG. 5) is copied to the INT 40h vector 244 (FIG. 5) at step 108 (FIG. 1) before the INT 13h is "hooked" at step 110 (FIG. 1). Thus, under the procedure 118 (FIG. 2), if the access request is not directed to the device handler 228, as determined at step 122 (FIG. 2), the access request is passed to the common handler 236 at either step 132 or step 130. However, unlike the situation that resulted in the problematic state 156 (FIG. 4) in the prior art, the INT 13h and 40h vectors 240 and 244 are the same before the device handler 228 is installed, so the INT 40h vector 244 is not actually changed. In this manner, the infinite loop problem that can potentially occur in the state 156 in the prior art, wherein the "no emulation" handler 162 (FIG. 4) repeatedly calls itself via an INT 40h request, cannot occur in the state 292 with the common handler 236, since the common handler 236 calls the next INT 40h entry, when appropriate at step 284 (FIG. 7), instead of issuing an INT 40h request.

For state 294 (FIG. 10), the common handler 236 is installed in a computer (e.g. 200, FIG. 5) having a previous state similar to the state 138 shown in FIG. 3, wherein a floppy drive (e.g. 218, FIG. 5) and a hard drive (e.g. 214, FIG. 5) have been previously installed with a device handler (e.g. 232, also shown in FIG. 5) and a device handler (e.g. 228, also shown in FIG. 5), respectively. After the installation of the device handler 228, the hard drive count is one. Therefore, the installation procedure 246 (FIG. 6) skips step 254 (FIG. 6) and does not copy the INT 13h vector 240 (FIG. 5) to the INT 40h vector 244 (FIG. 5). The installation procedure 246 retains the INT 40h vector 244 for the device handler 232 upon "hooking" the INT 40h at step 256 (FIG. 6) and retains the INT 13h vector 240 for the other device handler 228 upon "hooking" the INT 13h at step 258 (FIG. 6). The INT 13h and 40h vectors 240 and 244 are set to point to the common handler 236 at steps 256 and 258. Since the device handler 228 uses the procedure 118 (FIG. 2) to respond to access requests and the INT 40h vector 244 points to the common handler 236, the device handler 228 is shown in FIG. 10 with an arrow pointing toward the common handler 236 to account for the existence of step 130 (FIG. 2), wherein the procedure 118 calls INT 40h when the device number (specified in the DL register) is less than 80h. It is unlikely, however, that the device handler 228 will ever reach step 130 in the procedure 118, since a device number less than 80h will cause the common handler 236 at step 284 (FIG. 7) of the procedure 272 (FIG. 7) to pass the access request to the other device handler 232 as the next entry in the INT 40h chain 300, instead of to the device handler 228.

For state 296 (FIG. 11), another INT 13h device (e.g. hard drive 216, FIG. 5) is installed in a computer (e.g. 200, FIG. 5) previously having the state 294 (FIG. 10). Assuming that the common handler 236 involves the "El Torito" standard "floppy emulation," the hard drive count after installation of the common handler 236 is still one, the device number for the hard drive 216 and the device handler 230 (FIG. 5) is 81h and the device number for the common handler device 224 (FIG. 5) and the common handler 236 is 00h. Since the device numbered 81h (hard drive 216) is not a common handler device, it is installed using the conventional installation procedure 100 (FIG. 1) and responds to access requests using the conventional procedure 118 (FIG. 2). Under the installation procedure 100, since the hard drive count is one at step 106 (FIG. 1), step 108 (FIG. 1) is skipped before the INT 13h is "hooked" at step 110 (FIG. 1), so the INT 40h vector 244 (FIG. 5) remains pointing to the common handler 236. Thus, under the procedure 118 (FIG. 2), if the access request is not directed to the device handler 230, as determined at step 122 (FIG. 2), the access request is passed to the common handler 236 at either step 132 or step 130 (FIG. 2). In other words, unlike the situation that results in the problematic state 160 (FIG. 4) in the prior art, wherein the "floppy emulation" handler 166 is bypassed when the device number of the requested device is 00h, the device handler 230 cannot bypass the common handler 236.

The present invention has the advantage of ensuring that access requests directed to peripheral devices, including conventional and "El Torito" devices, reach the desired peripheral devices. The present invention has the further advantage of inserting the improved common handler 236 (FIGS. 5 and 8–11) into both the INT 13h and 40h chains 298 and 300 (FIGS. 8–11), so that the common handler 236 cannot be bypassed and so that the common handler 236, when appropriate, can direct the access request to the next entry in the correct chain 298 or 300.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of configuring a computer to use a selected peripheral device and of accessing the selected peripheral device, the computer using multiple peripheral devices accessed through corresponding device handlers arranged in first and second chains of device handlers, selected device handler corresponding to the selected peripheral device, comprising the steps of:

inserting the selected device handler in the first and second chains of device handlers in front of next first-chain and second-chain device handlers, respectively;

directing an access request to one of the device handlers for access to a corresponding peripheral device; and passing the access request to the selected device handler through one of the first and the second chains of device handlers.

2. A method as defined in claim 1 comprising the further steps of:

determining whether the access request is directed to the selected device handler for access to the selected peripheral device;

if the access request is directed to the selected device handler, processing the access request by accessing the selected peripheral device;

if the access request is not directed to the selected device handler, determining in which of the first and second chains of device handlers is the device handler to which the access request is directed;

if the device handler to which the access request is directed is in the first chain of device handlers, passing the access request to the next first-chain device handler in the first chain of device handlers; and if the device handler to which the access request is directed is in the second chain of device handlers, passing the access request to the next second-chain device handler in the second chain of device handlers.

3. A method as defined in claim 1 comprising the further steps of:

before directing the access request to one of the device handlers, inserting an initial first-chain device handler in the first chain of device handlers in front of the selected device handler;

before passing the access request to the selected device handler, issuing an interrupt call for the access request to the initial first-chain device handler in the first chain of device handlers;

determining whether the access request is directed to the initial first-chain device handler;

if the access request is directed to the initial first-chain device handler; processing the access request by accessing the peripheral device to which the initial first-chain device handler corresponds;

if the access request is not directed to the initial first-chain device handler; determining in which of the first and second chains of device handlers is the device handler to which the access request is directed;

if the device handler to which the access request is directed is in the first chain of device handlers, passing the access request to the selected device handler in the first chain of device handlers; and if the device handler to which the access request is directed is in the second chain of device handlers, passing the access request to the selected device handler in the second chain of device handlers.

* * * * *